US010821977B1

(12) United States Patent
Stein et al.

(10) Patent No.: US 10,821,977 B1
(45) Date of Patent: Nov. 3, 2020

(54) PRE-LOADING DRIVETRAIN TO MINIMIZE ELECTRIC VEHICLE ROLLBACK AND INCREASE DRIVE RESPONSIVENESS

(71) Applicant: Motiv Power Systems, Inc., Foster City, CA (US)

(72) Inventors: Elias Stein, San Francisco, CA (US); Justin Tomlin, San Francisco, CA (US); Tai-Sik Hwang, Foster City, CA (US); James Michael Castelaz, Alameda, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 132 days.

(21) Appl. No.: 16/191,996

(22) Filed: Nov. 15, 2018

Related U.S. Application Data

(60) Provisional application No. 62/586,877, filed on Nov. 15, 2017.

(51) Int. Cl.
*B60W 30/18* (2012.01)
*B60W 10/08* (2006.01)
*B60W 30/188* (2012.01)

(52) U.S. Cl.
CPC ...... *B60W 30/18027* (2013.01); *B60W 10/08* (2013.01); *B60W 30/188* (2013.01); *B60W 2540/10* (2013.01); *B60W 2540/12* (2013.01); *B60W 2710/083* (2013.01)

(58) Field of Classification Search
CPC ......... B60W 30/18027; B60W 30/188; B60W 10/08; B60W 2540/12; B60W 2540/10; B60W 2710/083
See application file for complete search history.

(56) References Cited

U.S. PATENT DOCUMENTS

2011/0010063 A1* 1/2011 Ota .................. B60K 6/365
701/58
2015/0329011 A1* 11/2015 Kawai .................. B62M 7/02
701/22

\* cited by examiner

*Primary Examiner* — Marthe Y Marc-Coleman
(74) *Attorney, Agent, or Firm* — Adibi IP Group, PC; Amir V. Adibi; Andrew C. Palmer

(57) ABSTRACT

Pre-loading drivetrain to minimize electric vehicle rollback and increase drive responsiveness. In an exemplary embodiment, a method includes (a) detecting that an electric vehicle is stationary, a brake is engaged, and an accelerator is not engaged, and (b) controlling a vehicle motor to transition from a first mode to a second mode in response to (a). In the first mode, the motor is controlled to output torque in response to the accelerator position, and in the second mode, the motor is controlled to output torque sufficient to preload the electric vehicle. The method also includes (c) detecting the brake is transitioning away from being engaged and the accelerator is not engaged, and (d) controlling the motor to operate in a third mode in response to (c). In the third mode the motor is controlled to output torque sufficient to maintain the electric vehicle stationary.

18 Claims, 10 Drawing Sheets

FORCES EXPERIENCED BY ELECTRIC VEHICLE ON
UPWARD SLOPED SURFACE

ELECTRIC VEHICLE

DRIVETRAIN SLACK

STATE DIAGRAM FOR CONVENTIONAL HILL HOLD CONTROL

PRE-LOADING DRIVETRAIN TO MINIMIZE ELECTRIC VEHICLE ROLLBACK AND INCREASE DRIVE RESPONSIVENESS

CROSS REFERENCE TO RELATED APPLICATIONS

This application claims the benefit under 35 U.S.C. § 119 from U.S. Provisional Patent Application Ser. No. 62/586,877, entitled "Pre-Loading Drivetrain To Minimize Electric Vehicle Rollback And Increase Drive Responsiveness," filed on Nov. 15, 2017, the subject matter of which is incorporated herein by reference.

TECHNICAL FIELD

The described embodiments relate to electric vehicles, and more particularly the drivetrain system within electric vehicles.

BACKGROUND INFORMATION

A typical electric vehicle drivetrain includes an electric motor coupled through a series of mechanical components to the vehicle's wheels. The coupling of these components has an inherent slack that must be taken up before torque at the motor shaft will be applied to the vehicle's wheels. During operation of the vehicle, torque is not applied while the vehicle is stationary and the driver is holding the vehicle with the service brakes. Thus at launch, there is additional delay between the application of torque at the motor and the application of torque at the wheels. This delay may manifest as a less responsive vehicle, which may be especially noticeable as increased rollback in a Hill Hold control scenario. Removing this slack is desirable.

SUMMARY

In various exemplary embodiments, a vehicle drivetrain is pre-loaded to reduce or minimize vehicle rollback and increase drive responsiveness. During operation of the vehicle, a system controller detects a stationary state of the vehicle. Preemptively, the controller can apply a small amount of pre-loading torque to the drivetrain in-order to eliminate slack in the components. The application of this torque occurs prior to the driver, a hill hold controller, or other controller requesting additional torque for system control. In doing so, all future torque increases can be applied without delay to create a faster and smoother vehicle response.

In an exemplary embodiment, a method is provided that includes (a) detecting that an electric vehicle is stationary, a brake is engaged, and an accelerator is not engaged, and (b) controlling a vehicle motor to transition from a first mode to a second mode in response to (a). In the first mode, the motor is controlled to output torque in response to the accelerator position, and in the second mode, the motor is controlled to output torque sufficient to preload the electric vehicle. The method also includes (c) detecting the brake is transitioning away from being engaged and the accelerator is not engaged, and (d) controlling the motor to operate in a third mode in response to (c). In the third mode the motor is controlled to output torque sufficient to maintain the electric vehicle stationary.

In an exemplary embodiment, an apparatus is provided that comprises a control circuit that performs operations of: (a) detecting an electric vehicle is stationary, a brake is engaged, and an accelerator is not engaged, and (b) controlling a vehicle motor to transition from a first mode to a second mode in response to (a). In the first mode, the motor is controlled to output torque in response to the accelerator position, and in the second mode, the motor is controlled to output torque sufficient to preload the electric vehicle. The operations also include (c) detecting the brake is transitioning away from being engaged and the accelerator is not engaged, and (d) controlling the motor to operate in a third mode in response to (c). In the third mode the motor is controlled to output torque sufficient to maintain the electric vehicle stationary.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

Figure 1:
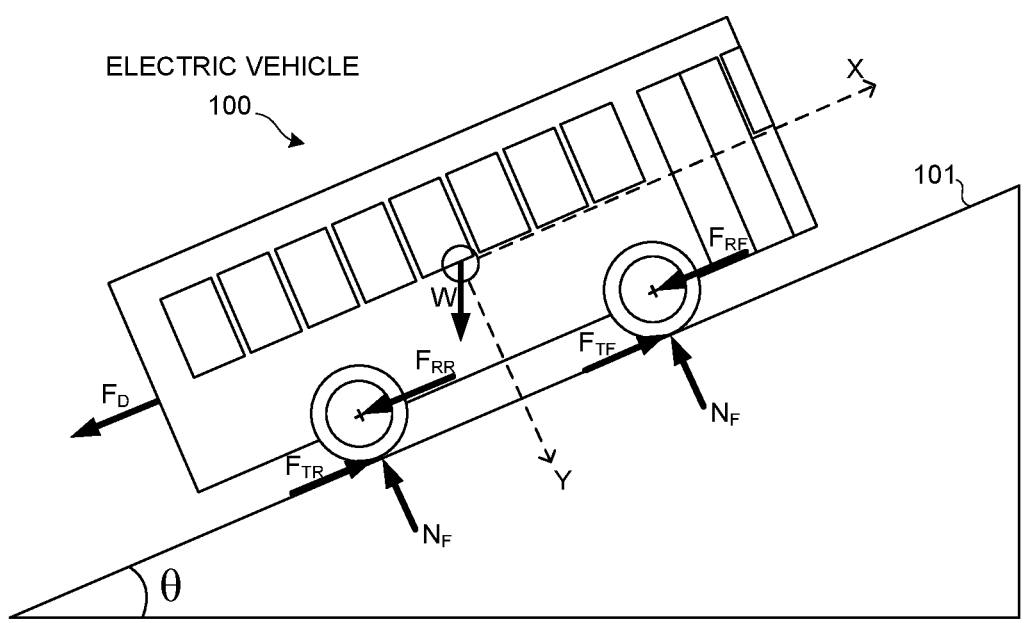
FIG. 1 is a diagram of the forces experienced by an electric vehicle 100 on an upward sloped surface 101.

FIG. 1 is a diagram of the forces experienced by an electric vehicle 100 on an upward sloped surface 101. As illustrated in FIG. 1, the electric vehicle 100 is on the surface 101. The electric vehicle 100 includes a drivetrain that comprises an electric motor coupled through a series of mechanical components to the vehicle's wheels.

The surface 101 is sloped upward at an angle theta θ. A force representing the weight W of the vehicle 100 due to gravity is shown. A downward force $F_D$ acts on the electric vehicle 100 forcing the vehicle backwards down the upward sloped surface 101. A traction force $F_{TR}$ and a rolling force $F_{RR}$ act upon the rear wheel. A traction force $F_{TF}$ and a rolling force act on the front wheel $F_{RF}$. Normal force $N_F$ opposes gravity and is shown acting on the front wheel and rear wheel. The downward force $F_D$ is a net force that must be overcome to maintain the electric vehicle in a stationary position.

Electric vehicle 100 has an accelerator and brakes that are operable by a driver. The accelerator is coupled to a throttle that regulates the operation of the electric motor. During operation, a driver engages the brakes on the sloped surface 100 until the electric vehicle 100 comes to a complete stop. Eventually, the driver will want to disengage the brakes and engage the accelerator to activate the drivetrain to drive the electric vehicle forward and up the rest of the sloped surface 101. However, between disengaging the brakes and engaging the accelerator, the electric vehicle may undesirably roll backwards down the sloped surface 101 due in part to the downward force $F_D$. One reason for the rollback is due to the mechanical lag or delay caused by free play and/or loose mechanical coupling between joints and spring forces and between mechanical mounts across the drivetrain. This rollback and mechanical delay is undesirable and is to be reduced or minimized. Conventional systems will also experience an abrupt change in load while launching the vehicle from a stop, as the drivetrain is transitioning from a slack state to a loaded state. The response of a typical drivetrain with multiple mechanical resonances to a step load, as well as limitations in the bandwidth of the controller, constitute further sources of rollback and delay.

In accordance with at least one novel aspect, the amount of rollback is reduced or minimized by pre-loading the drivetrain of the vehicle to supply an amount of torque to one or more of the wheels during a pre-loading mode. By pre-loading the drivetrain during the time between the disengaging of the brakes and engaging of the accelerator, the mechanical lag is reduced and the drive train is said to be "primed". Pre-loading the drivetrain is also found to improve performance on non-sloped surfaces because by pre-loading the drivetrain, the electric vehicle is more responsive to the accelerator.

Figure 2:
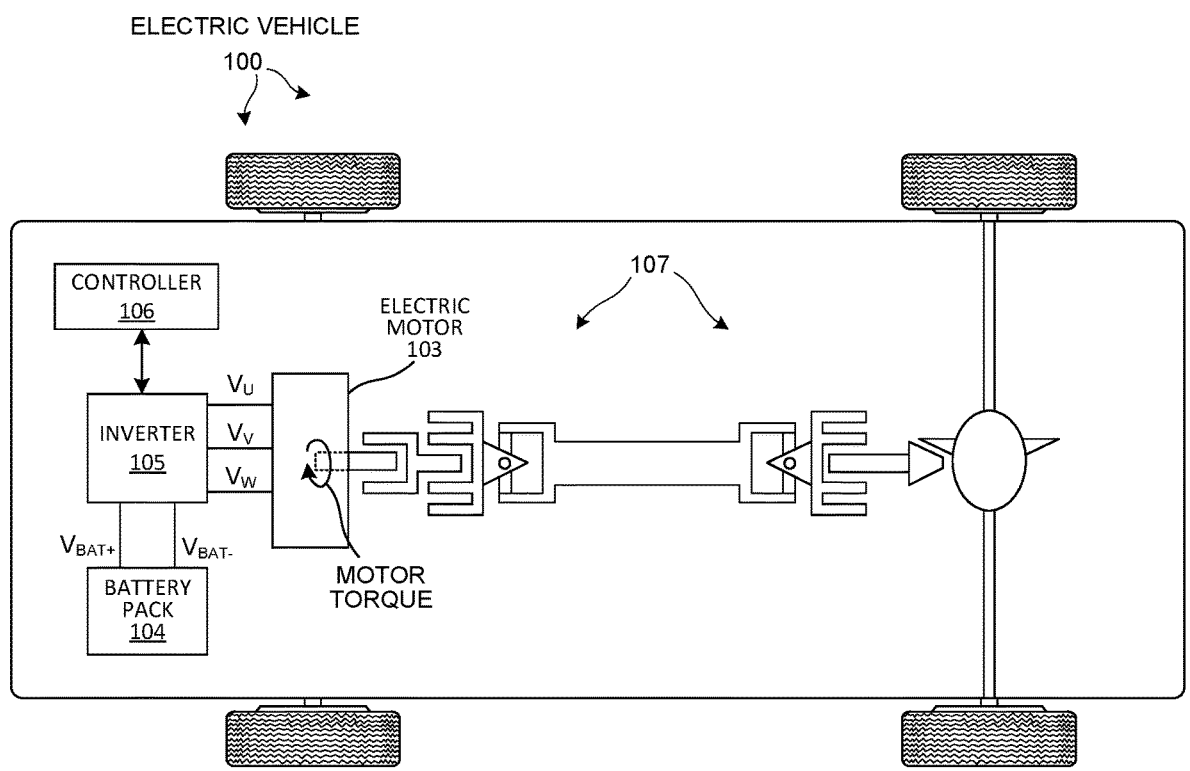
FIG. 2 is a high-level diagram of a drivetrain of an electric vehicle 100.

FIG. 2 is a high-level diagram of a drivetrain of the electric vehicle 100. In this example, the electric vehicle 100 has an electric motor 103 that generates motor torque. The electric motor 103 is powered by a voltage source 104. In this example, the voltage source 104 is a battery pack. An inverter 105 receives a DC voltage from the battery pack 104 and generates three voltages Vu, Vv, and Vw that are supplied to and control the electric motor 103. The battery pack 104 outputs a positive voltage $V_{BAT+}$ onto a positive DC supply voltage conductor and outputs a negative voltage $V_{BAT-}$ onto a negative DC supply voltage conductor. Controller 106 controls the inverter 105 to drive the electric motor 103 in a desired fashion by drawing power from the battery pack 104. In one example, the controller 106 is an integrated circuit having a processor and a memory. The electric vehicle 100 includes a drivetrain 107 that includes the motor 103 and various mechanical components that transfer the mechanical energy output from the motor 103 to the wheels. For example, motor torque generated by the electric motor 103 is transferred through the drivetrain 107 to one or more of the wheels. Details of the drivetrain 107 are explained in further detail below.

Figure 3:
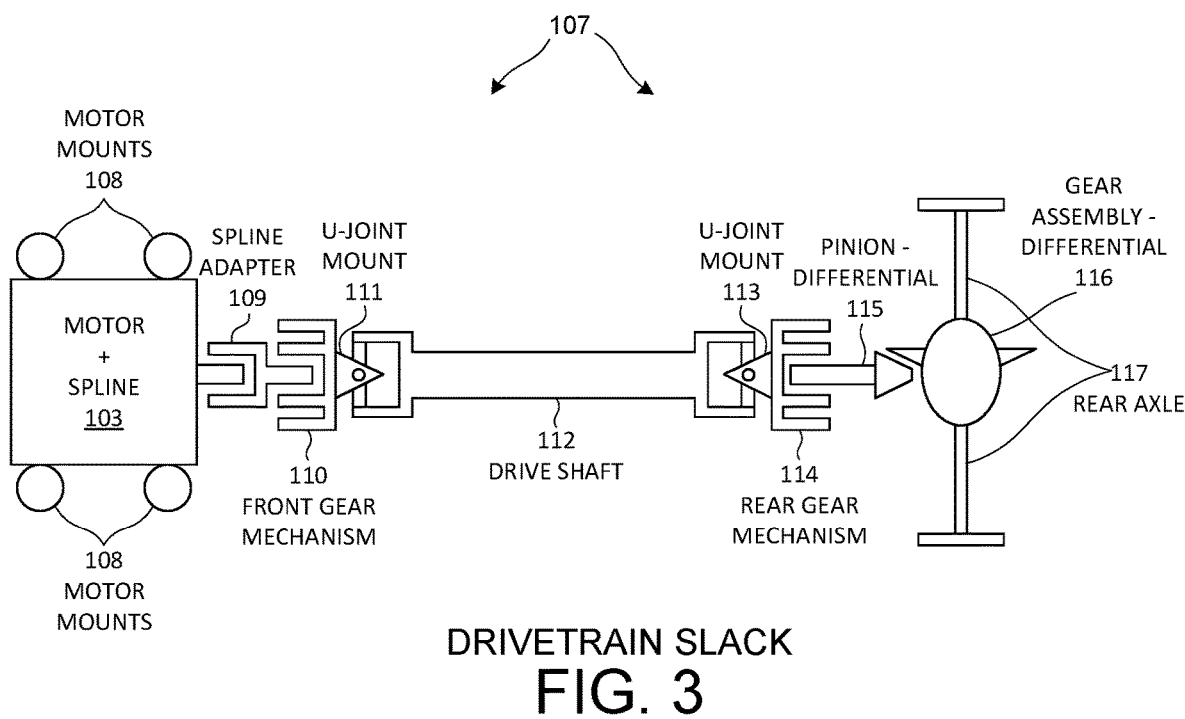
FIG. 3 is a diagram showing various sources of drive train slack due to various mechanical connections.

FIG. 3 is a more detailed diagram of the drivetrain 107 of the electric vehicle 100. In one embodiment, the drivetrain 107 comprises an electric motor 103 having a spline, motor mounts 108 attaching the motor 103 to the chassis (not shown), a spline adapter 109, a front gear mechanism 110, a U-joint mount 111, a drive shaft 112, a U-joint mount 113, a rear gear mechanism 114, a pinion-differential 115, a gear assembly differential 116, and a rear axle 117. Mechanical components mated or coupled together have inherent mechanical slack. The mechanical slack of the drivetrain 107 is what causes vehicle rollback or reduced responsiveness of the vehicle drive system. This mechanical slack is caused by free play due to tolerances in gears, loose mechanical coupling in joints, spring forces based on stiffness of the drive shaft, rubber mounts between motor and chassis, spring forces on the rear axle, in addition to other sources of mechanical slack. In various exemplary embodiments, this mechanical slack is reduced by pre-loading the drive train during desirable modes of operation.

Figure 4:
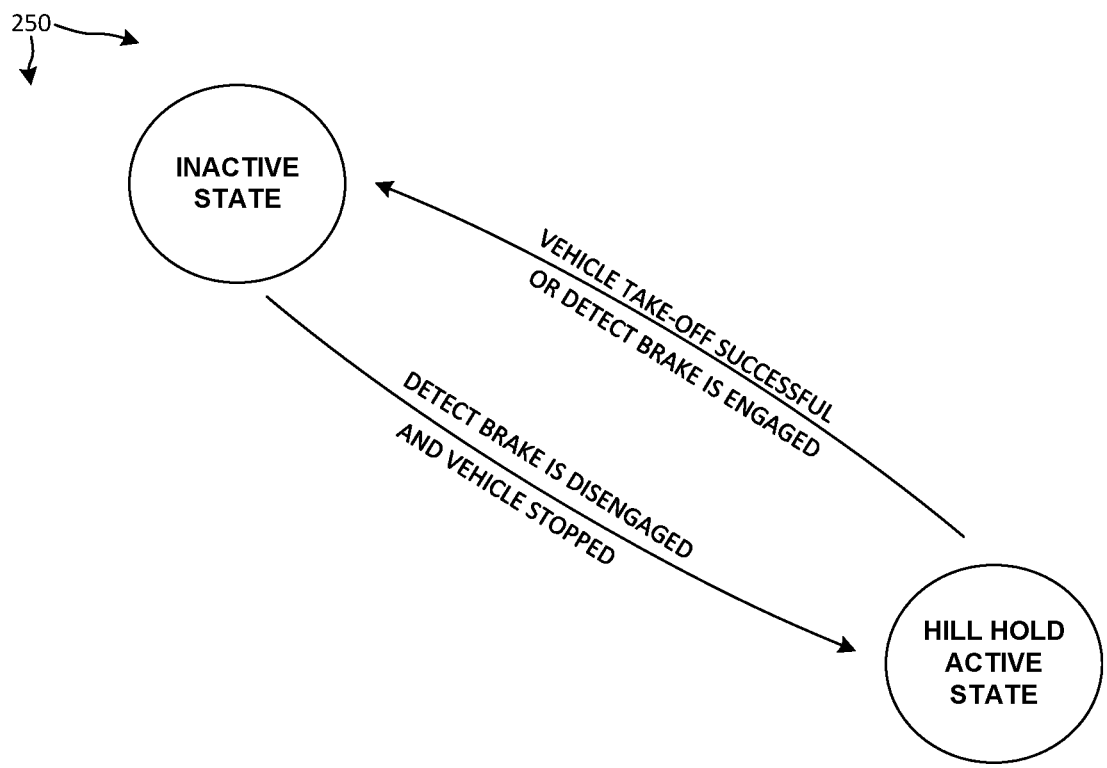
FIG. 4 is a state diagram for conventional operation of the electric vehicle 100.

FIG. 4 is a state diagram 250 for conventional operation of the electric vehicle 100 without novel preloading of the drivetrain. In the state diagram 250, there is an inactive state and a hill hold active state. Control switches from the inactive state to the hill hold active state when brake disengagement is detected and the electric vehicle 100 is stopped on a slope. Once the electric vehicle 100 has a successful take-off or brake engagement is detected, control switches from the hill hold active state to the inactive state.

Figure 5:
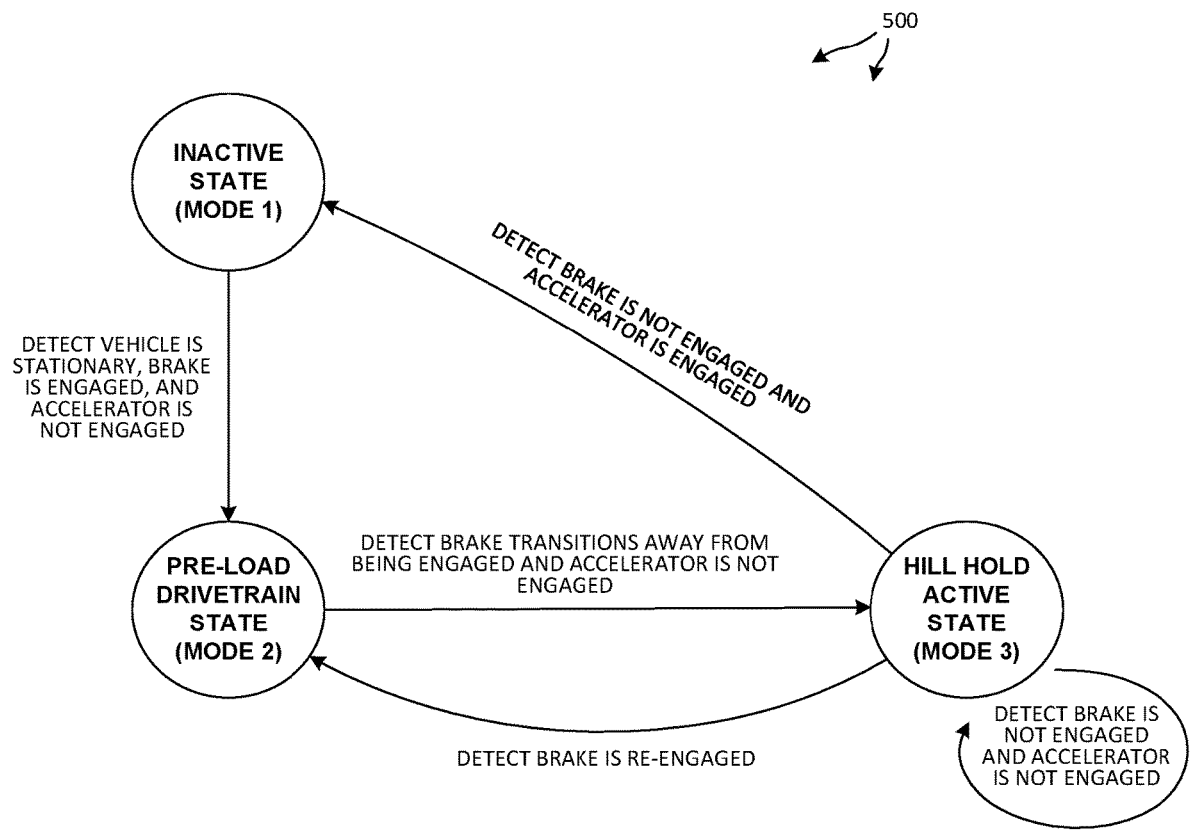
FIG. 5 is a state diagram that illustrates pre-loading of the drivetrain in accordance with one novel aspect.

FIG. 5 is a state diagram 500 that illustrates pre-loading of the drivetrain in accordance with one novel aspect. In the state diagram, there are three states, namely: an inactive state, pre-load drivetrain state, and hill hold active state. In an exemplary embodiment, the three states correspond to three operating modes. For example, the inactive state corresponds to operating mode 1, the pre-load drivetrain state corresponds to operating mode 2, and the hill hold active state corresponds to operating mode 3. Assuming that the electric vehicle is stopped on a slope with the brake engaged and the accelerator is not engaged, the pre-load drivetrain state is entered and the drivetrain is pre-loaded.

During pre-loading, the controller applies a torque signal such that the free play angle is zero at all mechanical coupling points within the drivetrain. In the example of FIG. 3, various mechanical coupling points exist at 109, 110, 111, 113, 114, 115, and 116. Once zero free play is achieved, the torque signal may be adjusted to achieve an additional motor shaft rotation counter to the lumped torsional spring forces within the drivetrain. This additional motor shaft rotation is tuned based on vehicle requirements and characterization. A slew limit determines a rate at which the torque is ramped. The slew limit is selected to reduce unwanted vibrational forces on the drivetrain. A slew limit that results in gradual ramping of torque is desirable to avoid a driver noticing that the drivetrain is actively supplying torque. In one example, the slew limit is set such that a bandwidth of a torque control signal is less than a mechanical resonance frequency of the drivetrain.

When the brake transitions away from being engaged and the accelerator is not engaged, the hill hold active state is entered. The vehicle maintains its position due to the drivetrain preloading.

The hill hold active state can be exited if the vehicle has a successful take-off (e.g., the accelerator is engaged) and the brake is not engaged. Under these conditions, the inactive state is entered.

The hill hold active state can also be exited if the brake is re-engaged. In this case, the pre-load drivetrain state will be entered.

Figure 6:
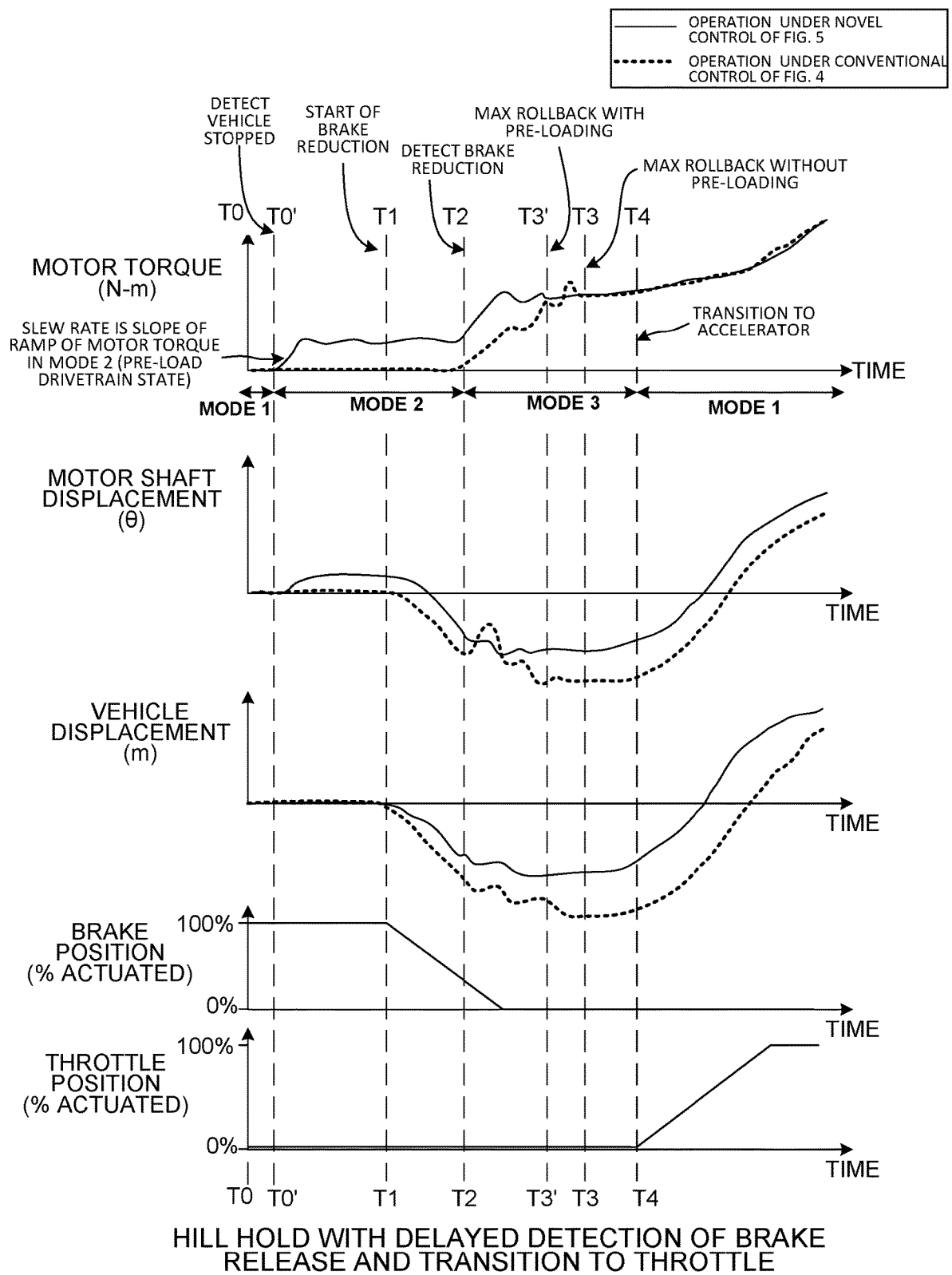
FIG. 6 shows waveform diagrams that illustrate the operation of the electric vehicle 100 in accordance with the state diagrams shown in FIGS. 4-5 with delayed detection of brake release and transition to throttle.

FIG. 6 shows waveform diagrams that illustrate the operation of the electric vehicle 100 in accordance with the state diagrams shown in FIGS. 4-5 with delayed detection of brake release and transition to throttle. The operation of a vehicle according to the state diagram in FIG. 4 is shown by dashed lines and the operation of a vehicle according to the state diagram in FIG. 5 is shown by solid lines. The graphs illustrate the relationships between motor torque (Nm), motor shaft displacement (θ), vehicle displacement (m), brake position, and throttle position over a period of time (t). From time $t_0$ to $t_0'$ there is no motor torque, no motor shaft displacement, and no vehicle displacement.

At time $t_0'$ the electric vehicle 100 is stopped on the hill. From $t_1$ to $t_4$ the electric vehicle 100 is transitioning from brake to throttle (e.g., accelerator). From $t_4$ onward, the user applies the throttle. From $t_1$ to $t_2$ there is no motor torque applied under the conventional control, but there is some motor shaft displacement as well as some vehicle displacement in the negative direction.

At $t_0'$ the novel control enters Mode 2 (pre-load drivetrain state). The conventional control takes no action from $t_0'$ to $t_2$.

At $t_2$ the hill hold state activates. From time $t_2$ to $t_3$ the motor begins to apply as much torque as required to stop the electric vehicle 100. In addition, there is a jump in motor shaft displacement caused by the slack. Also, during this time there is also more vehicle displacement and a delay caused by slack and torque ramp-up.

At time $t_3$ the electric vehicle 100 reaches a max vehicle roll back displacement when there is no-preload of the drive train. From $t_3$ to $t_4$ the motor applies a constant amount of motor torque. The motor shaft displacement is stabilized. Also, during this time, the electric vehicle 100 remains at the max vehicle roll back distance when there is no preload. Time $t_3'$ indicates when the electric vehicle 100 reaches a max vehicle roll back displacement with novel control of FIG. 5 that includes the hill hold active state (Mode 3). Time $t_3'$ occurs before time $t_3$ resulting in more desirable performance as compared to the conventional control technique of FIG. 4.

At time $t_4$ the user begins to apply the throttle to the electric vehicle 100. From $t_4$ onward, the motor torque increases as well as the motor shaft displacement. In addition, the vehicle displacement decreases from the negative direction and eventually goes in the positive direction.

Figure 7:
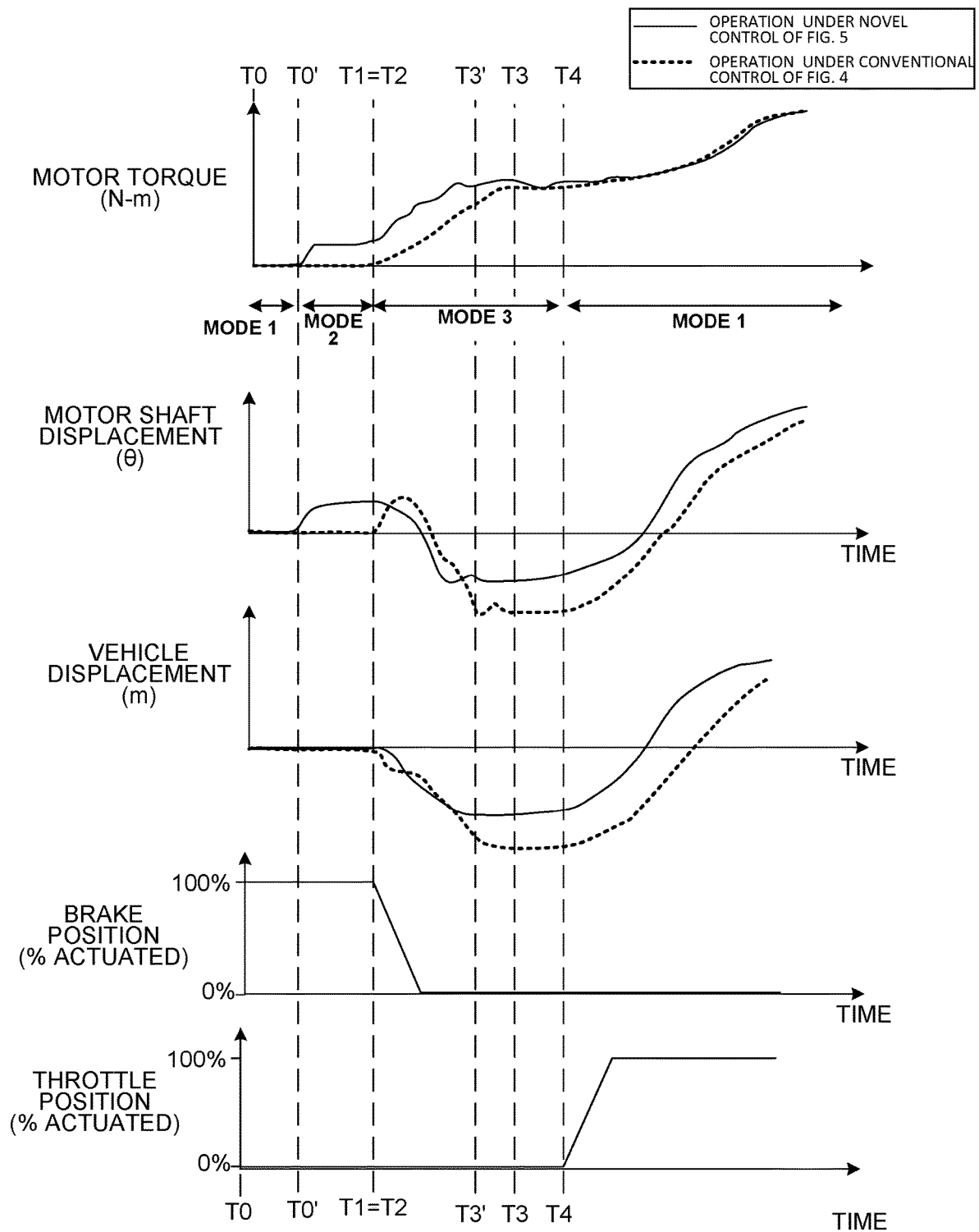
FIG. 7 shows waveform diagrams that illustrate the operation of the electric vehicle 100 in accordance with the state diagrams shown in FIGS. 4-5 with instantaneous detection of brake release and transition to throttle.

FIG. 7 shows waveform diagrams that illustrate the operation of the electric vehicle 100 in accordance with the state diagrams shown in FIGS. 4-5 with instantaneous detection of brake release and transition to throttle. The operation of a vehicle according to the state diagram in FIG. 4 is shown by dashed lines and the operation of a vehicle according to the state diagram in FIG. 5 is shown by solid lines. The waveforms illustrate the relation between motor torque (Nm), motor shaft displacement (θ), and vehicle displacement (m), over a period of time (t). From time $t_0$ to $t_0'$ there is no motor torque, no motor shaft displacement, and no vehicle displacement.

From time $t_0$ to $t_0'$ the vehicle is stopping. Prior to $t_0'$ the electric vehicle 100 is stopped on the hill. At this point the motor torque begins pre-loading the drivetrain under novel control. During this time, the motor shaft is slightly displaced as the pre-loading occurs. However, there is no vehicle displacement from $t_0$ to $t_1$.

At $t_2$ the hill hold state activates. From time $t_2$ to $t_3$ the motor begins to apply as much torque as required to stop the electric vehicle 100. Due to the pre-loading there is no jump in the motor shaft displacement. From $t_2$ to $t_3'$ there is still vehicle and motor shaft displacement due to torque ramp-up limitations. However, the time between $t_2$ and $t_3'$ is reduced compared to that between $t_2$ and $t_3$ and non-pre-loaded case.

At time $t_3'$ the electric vehicle 100 reaches a max vehicle roll back displacement under novel control. From $t_3'$ to $t_4$ the motor applies a constant amount of motor torque. The motor shaft displacement is stabilized. Also, during this time, the electric vehicle 100 remains at the max vehicle roll back distance when pre-loading was applied. This maximum distance will be less than the maximum rollback distance experienced without pre-loading in FIG. 4, which is indicated at time $t_3$.

At time $t_4$ the user begins to apply the throttle to the electric vehicle 100. From $t_4$ onward, the motor torque increases as well as the motor shaft displacement. In addition, the vehicle displacement decreases from the negative direction and eventually goes in the positive direction.

Figure 8:
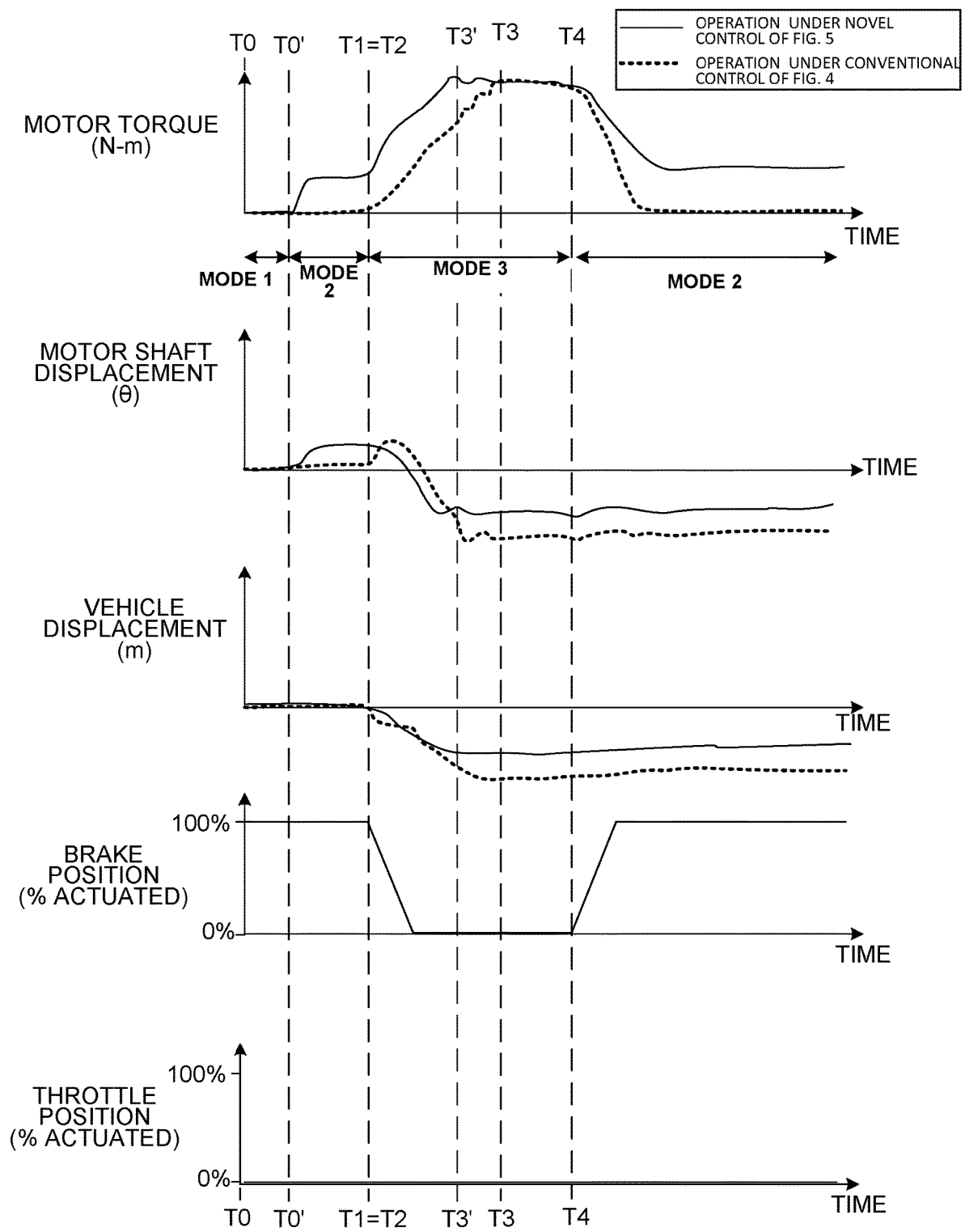
FIG. 8 shows waveform diagrams that illustrate the operation of the electric vehicle 100 in accordance with the state diagrams shown in FIGS. 4-5 with instantaneous detection of brake release and transition to brake.

FIG. 8 shows waveform diagrams that illustrate the operation of the electric vehicle 100 in accordance with the state diagrams shown in FIGS. 4-5 with instantaneous detection of brake release and transition to brake. The operation of a vehicle according to the state diagram in FIG. 4 is shown by dashed lines and the operation of a vehicle according to the state diagram in FIG. 5 is shown by solid lines. The waveforms illustrate the relation between motor torque (Nm), motor shaft displacement (θ), and vehicle displacement (m), over a period of time (t).

From time $t_0$ to $t_0'$ the vehicle is stopping. Prior to $t_0'$ the electric vehicle 100 is stopped on the hill. At this point the motor torque begins pre-loading the drivetrain under novel control. During this time, the motor shaft is slightly displaced as the pre-loading occurs. However, there is no vehicle displacement from $t_0$ to $t_1$.

At $t_2$ the hill hold state activates. From time $t_2$ to $t_3$ the motor begins to apply as much torque as required to stop the electric vehicle 100. Due to the pre-loading there is no jump in the motor shaft displacement. From $t_2$ to $t_3'$ there is still vehicle and motor shaft displacement due to torque ramp-up limitations. However, the time between $t_2$ and $t_3'$ is reduced compared to that between $t_2$ and $t_3$ and non-pre-loaded case.

At time $t_3'$ the electric vehicle 100 reaches a max vehicle roll back displacement under novel control. From $t_3'$ to $t_4$ the motor applies a constant amount of motor torque. The motor shaft displacement is stabilized. Also, during this time, the electric vehicle 100 remains at the max vehicle roll back distance when pre-loading was applied. This maximum distance will be less than the maximum rollback distance experienced without pre-loading in FIG. 4, which is indicated at time $t_3$.

At time $t_4$ the user begins to engage the brake on the electric vehicle 100. From $t_4$ onward, the motor torque is ramped to the required amount of torque to preload the drivetrain.

Figure 9:
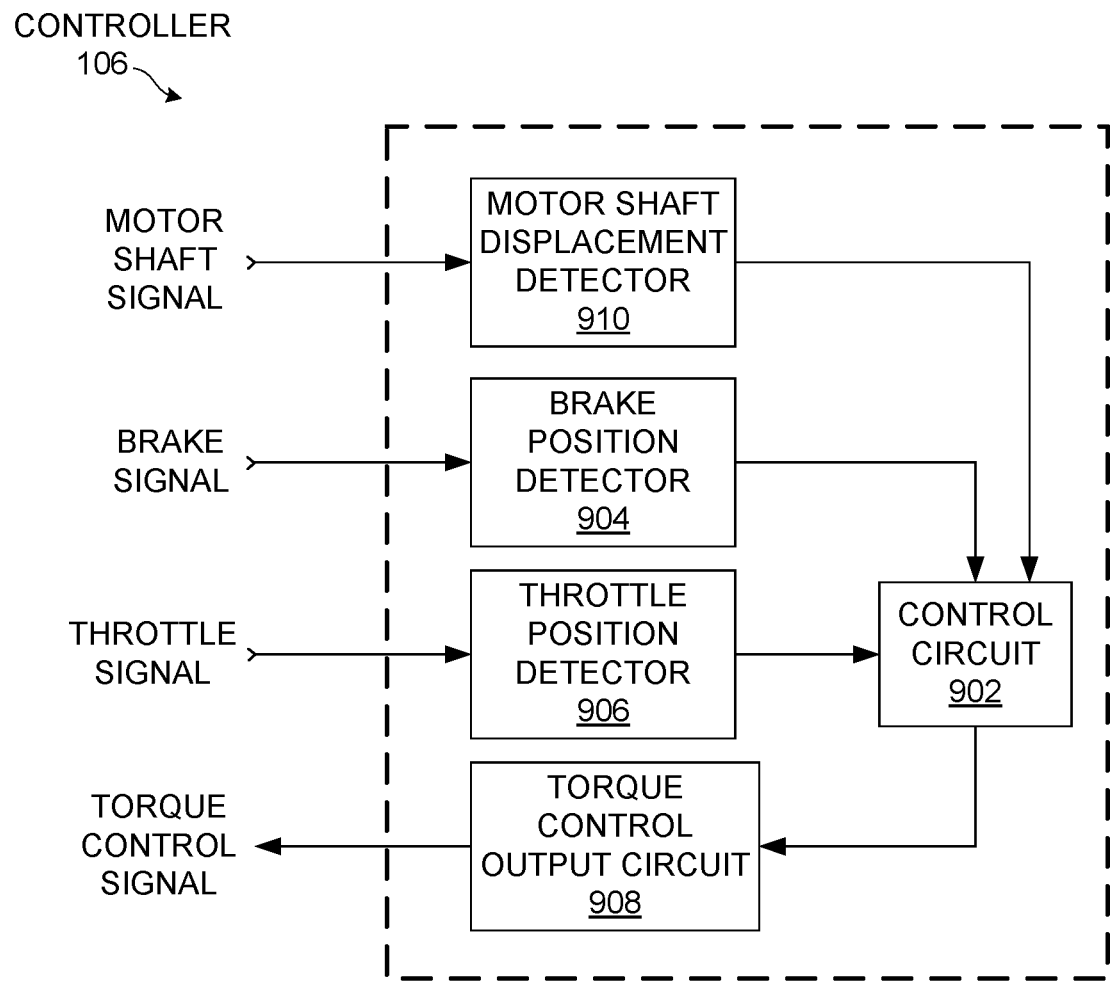
FIG. 9 shows a detailed exemplary embodiment of the controller 106 shown in FIG. 2.

FIG. 9 shows a detailed exemplary embodiment of the controller 106 shown in FIG. 2. In an exemplary embodiment, the controller 106 comprises control circuit 902, brake position detector 904, throttle position detector 906, torque control output circuit 908, and motor shaft displacement detector 910. In an exemplary embodiment, each of the control circuit 902, detector 904, detector 906, output circuit 908, and detector 910 comprise at least one component selected from a set that includes a state machine, processor, CPU, programmable gate array, RAM, ROM, memory, programmable logic, discrete logic devices, and discrete analog devices. In an exemplary embodiment, the controller 106 comprises one or more integrated circuits.

The brake position detector 904 comprises logic to receive a brake signal that corresponds to brake position and logic to output a detected brake position to the control circuit 902. The throttle position detector 906 comprises logic to receive a throttle signal that corresponds to throttle position, and logic to output a detected throttle position to the control circuit 902. The motor shaft displacement detector 910 comprises logic to receive a motor shaft signal that corresponds to motor shaft movement and/or displacement, and logic to output a detected motor shaft displacement to the control circuit 902.

In various exemplary embodiments, the control circuit 902 outputs a torque control signal in accordance with the methods and timing diagrams disclosed herein. In an exemplary embodiment, the control circuit 902 determines when the states (or operating modes) in the state diagram shown in FIG. 5 are entered or exited based on the received brake signal, throttle signal, and motor shaft signal. Based on the determined state and the received brake signal, throttle signal, and motor shaft signal, the control circuit 902 generates the torque control signal, which is then passed to the inverter 105. In mode 1, the torque control signal is determined based on the throttle signal. In mode 2, the torque control signal is generated such that the drivetrain of the vehicle is pre-loaded. In mode 3, the torque signal is controlled to stop the vehicle (e.g. vehicle velocity brought to zero).

Figure 10:
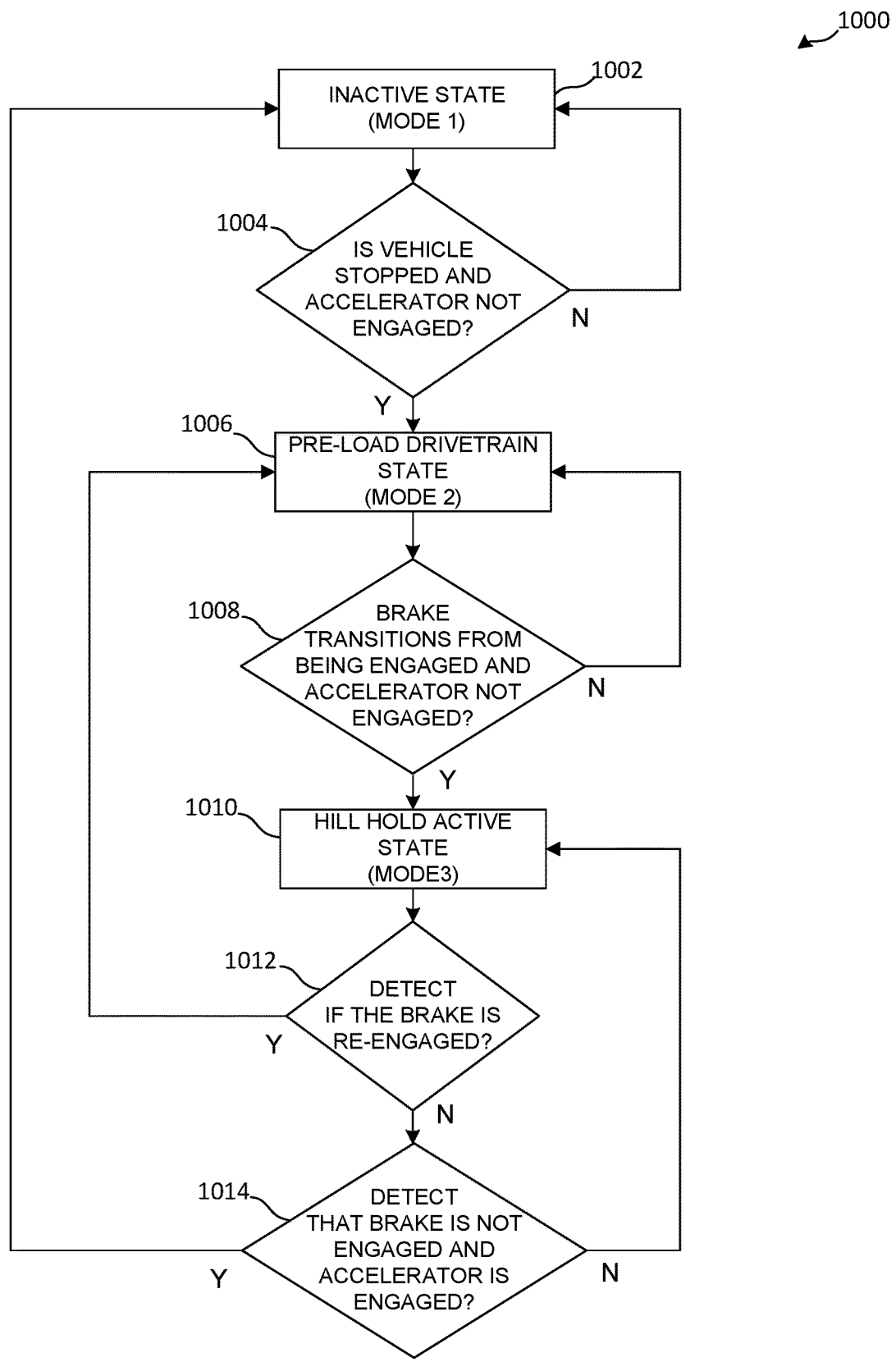
FIG. 10 shows an exemplary embodiment of a method for pre-loading a drivetrain of a vehicle.

FIG. 10 shows a detailed exemplary embodiment of a method 1000 for pre-loading a drivetrain to reduce or minimize vehicle rollback. For example, the method 1000 is suitable for use with the controller 106 to reduce or minimize rollback of the electric vehicle 100 when operated on a sloped surface.

At block 1002, an inactive state exists. For example, the controller 106 determines that a vehicle is in motion and that the drivetrain does not require pre-loading.

At block 1004, a determination is made as to whether the vehicle has stopped on a sloped surface and the accelerator is not engaged. For example, the controller 106 determines if the vehicle is stopped and the accelerator is not engaged. If the vehicle is not stopped or the accelerator is engaged, then the method remains in the inactive state at block 1002. If the vehicle has stopped and the accelerator is not engaged, then the method proceeds to block 1006.

At block 1006, a pre-load drivetrain state exists. In this state, the controller 106 prepares to provide pre-loading to the vehicle drivetrain.

At block 1008, a determination is made as to whether the brakes of the vehicle are transitioning from being engaged and the accelerator is not engaged. For example, the controller 106 determines if the brakes are transitioning from being engaged by evaluating the received brake signal. The controller 106 also determines if the accelerator is not engaged by the received throttle signal. If the brakes are not transitioning from being engaged or the accelerator is engaged, the method remains in the pre-load drivetrain state at block 1006. If the brakes are transitioning from being engaged and the accelerator is not engaged, the method proceeds to block 1010.

At block 1010, a hill hold state exists. In this state, the controller 106 outputs the torque control signal to enable the motor 103 to provide enough torque to the wheels of the vehicle to maintain the vehicle's position on the sloped surface. For example, the motor is controlled to provide enough torque to the wheels to counteract the force $F_D$ shown in FIG. 1 to maintain vehicle position.

At block 1012, a determination is made as to whether the brake is re-engaged. For example, the controller 106 determines if the brake is re-engaged by evaluating the received brake signal. If the brake is re-engaged, the method returns to the pre-load drivetrain state at block 1002. If the brakes were not re-engaged, the method proceeds to block 1014.

At block 1014, a determination is made as to whether the brakes of the vehicle are not engaged and the accelerator is engaged. For example, the controller 106 determines if the brakes are not engaged by evaluating the receive brake signal. The controller 106 also determines if the accelerator is engaged by evaluating the received throttle signal. If the brakes are engaged or the accelerator is not engaged, the method remains in the hill hold active state at block 1002.

Thus, the method 1000 operates to pre-load a vehicle drivetrain to reduce or minimize vehicle rollback. It should be noted that the operations of the method 1000 are exemplary, and not exhaustive, and that the operations may be changed, modified, rearranged, deleted, and/or added to within the scope of the embodiments.

Although certain specific exemplary embodiments are described above in order to illustrate the invention, the invention is not limited to the specific embodiments. For example, in another embodiment, a timer is started when entering into hill hold state (Mode 3). After the timer has elapsed, control transitions from hill hold state (Mode 3) to an inactive state (Mode 1). If the vehicle is on a slope, then the vehicle is likely to roll back. The timer ensures that the hill hold state (Mode 3) is only active for a pre-determined amount of time. Accordingly, various modifications, adaptations, and combinations of various features of the described embodiments can be practiced without departing from the scope of the invention as set forth in the claims.

What is claimed is:

1. A method comprising:
   (a) detecting an electric vehicle is stationary, a brake is engaged, and an accelerator is not engaged, wherein the vehicle has a motor;
   (b) controlling the motor to transition from a first mode to a second mode in response to (a), wherein in the first mode, the motor is controlled to output torque in response to the accelerator position, and wherein in the second mode, the motor is controlled to output torque sufficient to preload the electric vehicle;
   (c) detecting the brake is transitioning away from being engaged and the accelerator is not engaged; and
   (d) controlling the motor to operate in a third mode in response to (c), wherein in the third mode the motor is controlled to output torque sufficient to maintain the electric vehicle stationary.

2. The method of claim 1, wherein the preload of the electric vehicle involves applying sufficient torque to minimize slack along a torque path from the motor shaft to a ground.

3. The method of claim 1, wherein the slack is caused by at least one of free play due to tolerances in gears, loose mechanical coupling in joints, spring forces based on stiffness of a drive shaft, rubber mounts between motor and chassis, spring forces on a rear axle, and sources of angular displacement or elasticity.

4. The method of claim 1, wherein the electric vehicle is disposed on a sloped surface.

5. The method of claim 1, further comprising:
   (e) while in the third mode in (d), detecting the brake is not engaged and the accelerator is engaged; and
   (f) controlling the motor to operate in the first mode in response to (e).

6. The method of claim 1, further comprising:
   (e) while in the third mode in (d), detecting the brake is re-engaged; and
   (f) controlling the motor to operate in the second mode in response to (e).

7. The method of claim 1, wherein upon transition into the second mode in (b), the control involves ramping the torque from an initial value to a motor torque sufficient to preload the electric vehicle using a slew limit.

8. The method of claim 1, wherein there is delay between the brake releasing and (c).

9. An apparatus comprising:
a control circuit that performs operations of:
(a) detecting an electric vehicle is stationary, a brake is engaged, and an accelerator is not engaged, wherein the electric vehicle has a motor;
(b) controlling the motor to transition from a first mode to a second mode in response to (a), wherein in the first mode, the motor is controlled to output torque in response to the accelerator position, and wherein in the second mode, the motor is controlled to output torque sufficient to preload the electric vehicle;
(c) detecting the brake is transitioning away from being engaged and the accelerator is not engaged; and
(d) controlling the motor to operate in a third mode in response to (c), wherein in the third mode the motor is controlled to output torque sufficient to maintain the vehicle stationary.

10. The apparatus of claim 9, wherein the preload of the electric vehicle involves applying sufficient torque to minimize slack along a torque path from the motor shaft to a ground.

11. The apparatus of claim 9, wherein the slack is caused by at least one of free play due to tolerances in gears, loose mechanical coupling in joints, spring forces based on stiffness of a drive shaft, rubber mounts between motor and chassis, spring forces on a rear axle, and sources of angular displacement or elasticity.

12. The apparatus of claim 9, wherein the electric vehicle is disposed on a sloped surface.

13. The apparatus of claim 9, further comprising:
(e) while in the third mode in (d), detecting the brake is not engaged and the accelerator is engaged; and
(f) controlling the motor to operate in the first mode in response to (e).

14. The apparatus of claim 9, further comprising:
(e) while in the third mode in (d), detecting the brake is re-engaged; and
(f) controlling the motor to operate in the second mode in response to (e).

15. The apparatus of claim 9, wherein upon transition into the second mode in (b), the control involves ramping the torque from an initial value to a motor torque sufficient to preload the electric vehicle using a slew limit.

16. The apparatus of claim 9, wherein there is delay between the brake releasing and (c).

17. An electric vehicle comprising:
a motor; and
means for controlling the motor to transition from a first mode to a second mode in response to detecting the electric vehicle is stationary, a brake is engaged, and an accelerator is not engaged, wherein in the first mode, the motor is controlled to output torque in response to the accelerator position, and in the second mode, the motor is controlled to output torque sufficient to preload a vehicle drivetrain, wherein the means is also for detecting that the brake is transitioning away from being engaged and the accelerator is not engaged, wherein the means is also for controlling the motor to operate in a third mode in response to detecting that the brake is transitioning away from being engaged and the accelerator is not engaged, and wherein in the third mode, the motor is controlled to output torque sufficient to maintain the electric vehicle stationary.

18. The electric vehicle of claim 17, wherein the means is a control circuit.

* * * * *